United States Patent
Schollhamer

[15] 3,651,947
[45] Mar. 28, 1972

[54] FILTER

[72] Inventor: George R. Schollhamer, Philadelphia, Pa.

[73] Assignee: Rudd-Melikian, Inc., Warminster, Bucks County, Pa.

[22] Filed: Mar. 11, 1970

[21] Appl. No.: 18,570

[52] U.S. Cl..............................210/474, 210/478, 210/479, 210/489, 210/495, 210/499
[51] Int. Cl......................................................B01d 25/04
[58] Field of Search..................210/479, 480, 499, 474, 478, 210/495, 489; 99/289, 297, 300; 161/DIG. 5

[56] References Cited

UNITED STATES PATENTS

| 3,165,473 | 1/1965 | Pall et al. | 210/493 X |
| 3,206,031 | 9/1965 | Messa | 210/479 X |
| 3,334,753 | 8/1967 | Royer et al. | 210/493 X |
| 3,348,695 | 10/1967 | Rosaen | 210/499 X |
| 3,382,305 | 5/1968 | Breen | 161/DIG. 5 |
| 3,500,991 | 3/1970 | Vogt | 210/499 X |
| 3,496,861 | 2/1970 | Stahler | 99/289 |

FOREIGN PATENTS OR APPLICATIONS

| 1,157,197 | 11/1963 | Germany | 210/479 |
| 502,911 | 12/1954 | Italy | 210/495 |

Primary Examiner—Samih N. Zaharna
Assistant Examiner—Frederick F. Calvetti
Attorney—Seidel, Gonda and Goldhammer

[57] ABSTRACT

A filter is provided for beverage machines such as coffee machines. The filter material is a layer of woven or molded polymeric plastic having a mesh size of between about 52 and 70 microns. Filter material is supported by a coarse support grid which in turn is supported by a carrier.

3 Claims, 4 Drawing Figures

PATENTED MAR 28 1972 3,651,947

INVENTOR
GEORGE R. SCHOLLHAMER

BY
Seidel, Gonda & Goldhammer
ATTORNEYS.

FILTER

This invention relates to a filter particularly designed for use in beverage machines which have grounds and fines which are to be separated from a beverage as, for example, a coffee machine.

Many commercial coin operated coffee vending machines utilize fresh ground coffee and dispense freshly brewed single cup quantities of coffee upon demand. It is important that the brewed coffee be substantially free of fines. Fines not only leave an unattractive residue at the bottom of each cup of coffee but also render the bottom portion of each cup unpalatable.

It has been suggested that individual sheets of filter paper be used in brewing each cup of coffee. However, this has been unacceptable because of the expense thereof and because of the complexity of the mechanism for feeding and removing the individual sheet of filter paper.

It has also been suggested that a stainless steel electro etched filter be utilized. This has proven generally satisfactory. However, the stainless steel filter is expensive and must be cleaned periodically.

It has been further suggested that a nylon filter be used in combination with a stainless steel electro-etched filter. However, the expense of the electro-etched filter is not eliminated and the fines tended to clog the combined nylon and stainless steel filters.

It is an object of the present invention to provide a filter which overcomes the deficiencies of prior art filters.

It is another object of the present invention to provide a novel filter for beverage machines.

It is another object of the present invention to provide an expendable filter which can be manufactured inexpensively and the discarded after one or more uses.

It is another object of the present invention to provide a novel expendable filter for filtering out fines within an acceptable level for use in coffee machines.

Other objects will appear hereinafter.

The above and other objects are accomplished by providing the filter of the present invention. The filter is structurally interrelated in a manner so as to separate coffee grounds from the coffee beverage. The filter is structurally interelated in a manner whereby it may be made inexpensively so as to be disposable after one or more uses.

The filter material is a woven polymeric material such as nylon or polyester having a mesh size of about 52 to 70 microns. I have found that openings smaller than 52 micron mesh size will result in clogging of filter material. I have found that openings greater than 70 micron mesh size result in fines flowing through the filter in an amount which is above the acceptable level. The filter material may be supported by a discrete support grid which may include a mesh woven screen of stainless steel wire or the like. Alternatively, the support grid may be formed integrally in the carrier.

For the purpose of illustrating the invention, there is shown in the drawings a form which is presently preferred; it being understood, however, that this invention is not limited to the precise arrangements and instrumentalities shown.

Figure 1:
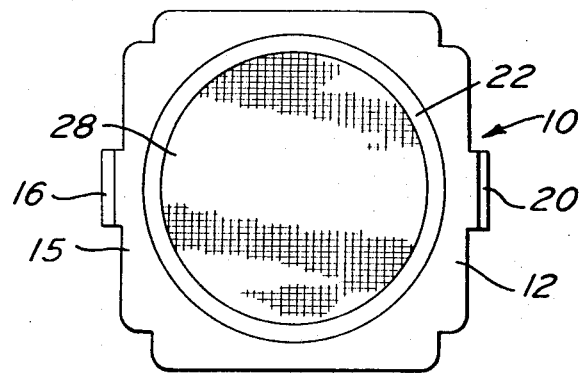
FIG. 1 is a perspective view of a filter in accordance with the present invention.

Referring to the drawings in detail, wherein like numerals indicate like elements throughout the several view there is shown in FIG. 1 a filter in accordance with the present invention designated generally as 10. The filter 10 includes a carrier 12 of any desired configuration. As illustrated, the carrier 12 is generally rectangular and made from a lightweight in expensive material such as a polymeric plastic. The carrier 12 may be constructed in any convenient manner but preferably is injection molded.

The carrier 12 is provided with mounting means for securring it in proper position in a coffee beverage machine. The mounting means, as illustrated, includes a pair of downwardly depending legs 14 and 18 on opposite sides of the carrier. Leg 14 is provided with a latching surface 16. Leg 18 is provided with a corresponding latching surface 20. Other mounting means may be provided as desired.

The carrier 12 is provided with a generally rectangular shaped peripheral groove 21. A sealing ring 22 having a generally rectangular cross section is composed of a resilient material such as rubber or plastic and is force-fitted in the groove 21. The height of the ring 22 is such that it its upper surface projects slightly beyond the top wall 15 of the carrier 12 as will be apparent from FIG. 2. A centrally disposed planar support surface 24 is provided having a downwardly depending skirt 26 Support surface 24 is circular in configuration and of a size so that the skirt 26 provides the inner peripheral wall for the groove 21. The remainder of the groove is defined by bottom wall 25 and outer peripheral wall 27.

The support surface 24 has a plurality of holes substantially uniform in size therein to form a grid. The surface 24 has preferably the appearance and dimensions of a woven mesh screen which is relatively coarse. The purpose of the surface 24 is to provide the necessary support for a layer of filter material 28. In a conventional coffee machine, pressures utilized to force the water through the coffee grinds are in the range of 7 to 14 p.s.i. and are commonly in the nature of 10 p.s.i. I have found that the operation of the filter is unsatisfactory unless the layer of filter material 28 is supported by the mesh support 24.

The layer of filter material 28 is preferably a polymeric plastic woven fabric material such as a fabric of polyester or a polyamide. A suitable polyamide would be nylon and a suitable polyester would be Dacron. The layer of filter material 28 has a mesh screen size of between 52 and 70 microns. I have found that openings smaller than 52 micron mesh size result in the filter being clogged by the fines. I have found that openings greater than 70 micron mesh size result in fines passing through the filter in an amount which is above the acceptable level in commercial coffee machines.

The layer of filter material 28 may be molded or woven so long as the critical micron size is attained. When the filter material 28 is made from nylon, it has a tendency to stain. I have found that polyester materials are less likely to stain when subjected to coffee. Both of these materials do not absorb heat rapidly, are not affected by the temperature of the coffee, and do not get sticky or oily during use.

Figure 3:
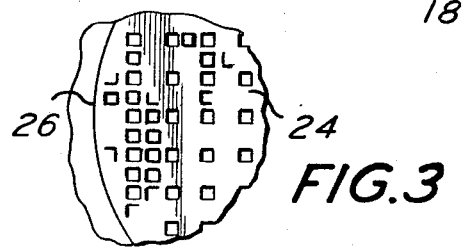
FIG. 3 is a partial plan view of the filter of FIG. 1.

The filter 10 is easily assembled and utilizes a minimum number of components. The filter material 28 and carrier 12 may be considered expendable and disposed of after one or more uses. Alternatively, the later of filter material 28 may be discarded after one or more uses while retaining the other elements. The layer of filter material 28 is removably secured to the carrier 12 and stretched taut over the surface 24. The ring 22 is placed over the filter material 28 which is preferably circular in configuration and of a diameter slightly greater than the diameter of the surface 24. The ring 22 locks the filter material 28 into place over the surface 24. The surface 24 prevents damaging distortion of the filter material 28 as the hot liquid passes therethrough. FIG. 3 is illustrative of surface 24 and the holes shown are larger and greater in number than actually utilized in surface 24. Surface 24 may be provided with the dimensions of an 18 × 18 mesh screen.

The filter material may be discarded after a desired number of uses. The ring 22 is merely removed from the groove 21 thus releasing the filter material 28. A plurality of holes 23 may be provided in the bottom wall 25 of the groove 21 to facilitate release of the ring 22. The used filter material 28 may be discarded and a new piece snap-fit into operative position.

It is deemed readily apparent that the filter of this invention is very economical to use. It has been found that the material 28 can last for a substantial number of cycles and need not be frequently changed. Furthermore, the material 28 is only material which need be discarded. Since the material 28 is relatively inexpensive, substantial savings may be effected by use of the filter of the present invention while a superior cup of coffee is produced.

Figure 4:
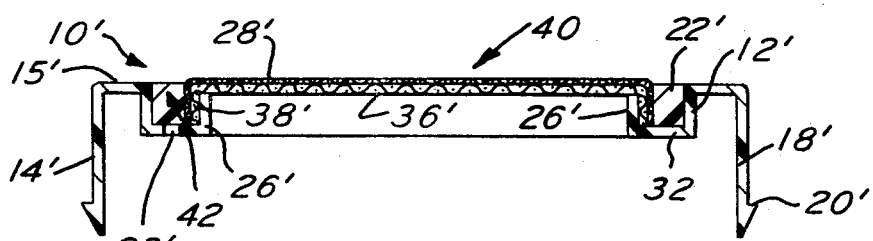
FIG. 4 is a sectional view similar to FIG. 2, but illustrating another embodiment of the present invention.

In FIG. 4, there is illustrated another embodiment of the filter of the present invention designated generally as 10' The filter 10' is identical with the filter 10 except as will be pointed out hereinafter. Accordingly, corresponding primed numerals are provided in FIG. 4 on corresponding structure as shown in FIG. 1-3.

In FIG. 4, the lower peripheral edge of the carrier 12' is provided with a horizontally disposed, inwardly extending flange 32 terminating at its inner end in an upwardly extending wall 26'. Flange 32 is slightly wider than wall 25 for a purpose which will be made clear hereinafter. The carrier 12' includes a centrally disposed bore 40. Wall 26' has a height which is less than the height of the carrier 12'. A screen 36 is used in place of the grid support surface 24. The screen 36 may be used as an insert when molding the carrier 12' so that the skirt 38 thereof is integrally secured to and forms a part of the wall 26'. Alternatively, the skirt 38 of the screen 36 may frictionally engage the wall 26', The screen 36 is preferably an 18×18 mesh screen woven from stainless steel wire having a diameter of 0.017 inches.

The flange 32 and wall 26' containing the skirt 38 cooperate with the remainder of the carrier to define annular groove 42. Annular groove 42 is slightly wider than corresponding groove 21 in order to accommodate skirt 38 of screen 36. The layer 28' is sufficiently large so as to overlie the screen 36 and extend radially outwardly therefrom. The ring 22' is force-fitted into the annular channel 42 and causes the outer peripheral portion of the layer 28' to extend downwardly into the annular channel 42 and overlie the upper surface of the flange 32. The layer 28' is thereby stretched taut over the bore 40 and screen 36.

Figure 2:
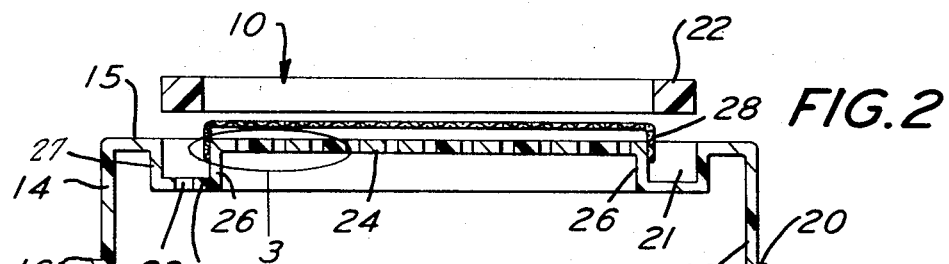
FIG. 2 is a sectional view taken along the line 2—2 in FIG. 1.

The embodiment 10' is otherwise identical with the embodiment shown in FIGS. 1 and 2. The filter 10' facilitates rendering only the layer of filter material 28' disposable while retaining all of the other elements. When it is desired to discard the layer of filter material 28', the first step is to pry up the ring 22'. One or more holes 23' may be provided in the flange 32 to facilitate pushing the ring 22' upwardly. Thereafter, the layer 28' is discarded and a new one substituted in its place, In the filter 10', it will be noted that the screen 24' remains as an integral part of the carrier.

The present invention has the advantage of materially reducing the cost of replacing filters while at the same time results in an inexpensive filter which will suprisingly filter out fines within an acceptable level commercially. The filters cost about 20 percent of the cost of filters previously used. Also it is surprising that a woven flimsly polymeric plastic material which is 0.002 to 0.004 inches thick could be used for this purpose so long as the critical mesh size is adhered to and is supported by the mesh screen support. In use, the direction of flow of the liquid is downwardly in FIG. 2. In the embodiment oFIG. 4, the carrier is generally flat with the size of the bore 40 being about 2 inches in diameter.

The present invention may be embodied in of the specific forms without departing from the spirit or essential attributes thereof and, accordingly, reference should be made to the appended claims, rather than to the foregoing specification as indicating the scope of the invention.

I claim:

1. A filter for use in a hot beverage making machine of the type where the hot beverage has grounds and fines which must be separated from the hot beverage comprising a carrier; means for mounting said carrier to such hot beverage making machine, said mounting means comprising at least two downwardly depending legs on opposite sides of said carrier, each of said legs being provided with a latching surface of engagement with such beverage making machine; said carrier having a substantially planar central portion through which such hot beverage may pass, said substantially planar central portion comprising a support surface with a plurality of holes therethrough; a peripheral groove formed in said carrier around said central portion, said peripheral groove comprising an inner peripheral wall adjacent said central portion, a bottom wall displaced from the plane of said central portion and an outer peripheral wall; a peripheral top wall disposed between said outer peripheral wall and the peripheral wall of the carrier said carrier; a layer of filter material overlying said support surface and extending into said peripheral groove, said layer of filter material comprising a porous fabric material selected from the group consisting of essentially polyesters and polyamides having a thickness of about 0.002 to about 0.004 inches and having openings of a mesh size of between about 52 and 70 microns so that a substantial portion of the particulate grinds and fines in a hot beverage can be filtered; said central portion having sufficient rigidity to restrain said layer of filter material from being forced downwardly through said central portion by such hot beverage when such hot beverage is at a pressure in the range of about 7 to 14 pounds per square inch; a sealing ring, said sealing ring being comprised of resilient material and having at least an upper surface, said sealing ring being disposed in said peripheral groove with said upper surface projecting slightly above said top wall, said sealing ring being in force fitting relation with said peripheral walls of said groove, and a circumferential portion of said layer of filter material is disposed between said inner peripheral wall and said sealing ring to constrain said layer of filter material against movement.

2. A filter as defined in claim 1 wherein said support surface is formed integrally with said carrier and comprises a plurality of holes of substantially uniform size, and said support surface is relatively coarse and corresponding to the appearance of a woven mesh screen.

3. A filter as defined in claim 1 wherein said first peripheral inner wall terminates below the plane of said peripheral top wall, said support surface comprising a screen, said screen being 18×18 mesh being woven from stainless steel wire having a diameter of about 0.017 inches, said screen underlying said layer of filter material in supporting relation thereto, a circumferential portion of said screen overlying said inner peripheral wall and being disposed between said circumferential portion of said layer of filter material and said inner wall so that said sealing ring constrains said screen in contact with said layer of filter material.

* * * * *